United States Patent
Ibrahim et al.

(10) Patent No.: US 8,607,216 B2
(45) Date of Patent: Dec. 10, 2013

(54) VERIFYING FIRMWARE

(75) Inventors: Wael M. Ibrahim, Cypress, TX (US); Graeme John Proudler, Bristol (GB)

(73) Assignee: Palm, Inc., Sunnyvale, CA (US)

( * ) Notice: Subject to any disclaimer, the term of this patent is extended or adjusted under 35 U.S.C. 154(b) by 386 days.

(21) Appl. No.: 13/055,245

(22) PCT Filed: Aug. 1, 2008

(86) PCT No.: PCT/US2008/071882
§ 371 (c)(1),
(2), (4) Date: Jan. 21, 2011

(87) PCT Pub. No.: WO2010/014109
PCT Pub. Date: Feb. 4, 2010

(65) Prior Publication Data
US 2011/0131403 A1    Jun. 2, 2011

(51) Int. Cl.
*G06F 9/45* (2006.01)
(52) U.S. Cl.
USPC ............................................... 717/168
(58) Field of Classification Search
USPC ............................................... 717/168
See application file for complete search history.

(56) References Cited

U.S. PATENT DOCUMENTS

| | | | |
|---|---|---|---|
| 6,546,492 B1 | 4/2003 | Walker et al. | |
| 7,237,126 B2 * | 6/2007 | Neufeld | 713/194 |
| 7,793,347 B2 * | 9/2010 | Rozas | 726/22 |
| 8,140,837 B2 * | 3/2012 | Campbell et al. | 713/1 |
| 2005/0097542 A1 | 5/2005 | Lee | |
| 2006/0020936 A1 * | 1/2006 | Wyatt | 717/162 |
| 2006/0143600 A1 | 6/2006 | Cottrell et al. | |
| 2007/0192611 A1 * | 8/2007 | Datta et al. | 713/176 |
| 2008/0168435 A1 | 7/2008 | Tupman et al. | |

FOREIGN PATENT DOCUMENTS

KR   102008005294   6/2008
WO   WO-2008054058  5/2008

OTHER PUBLICATIONS

International Search Report, Apr. 6, 2009.

* cited by examiner

*Primary Examiner* — John Chavis (57) ABSTRACT

Systems, methods, and other embodiments associated with updating firmware for a chip are described. One example method may include performing an external verification of updated firmware received and stored external to the chip to determine if the updated firmware is authentic. Upon determining that the updated firmware is authentic, the updated firmware is loaded into the chip. An internal verification of the updated firmware within the chip is performed to determine that the updated firmware is authentic. The internal verification is assured to succeed based on the external verification. Because the internal verification will succeed, the chip avoids reverting to a default firmware.

20 Claims, 5 Drawing Sheets

VERIFYING FIRMWARE

BACKGROUND

As the technology to produce integrated chips has advanced, the number of devices (e.g. transistors) placed on a chip has dramatically increased. An application specific integrated circuit (ASIC) may contain millions of transistors performing many different functions. A system on a chip (SOC) may contain multiple discrete functional units and multiple busses on a single chip. To control the operation of the many components on a chip, a controller may be used to execute firmware instructions from a memory within the chip. As software developers do for traditional software, firmware developers may produce upgraded versions of firmware that add or improve functionality or that fix bugs found in an earlier firmware version. When an updated firmware version is available, the user of the chip may want to upgrade to the updated firmware if it can be assured that the firmware is authentic.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with updating firmware to a chip in a secure, authenticated manner. Chips often do not have enough writable memory space to hold two versions of firmware. When an updated firmware image is available, it may be loaded into a memory within the chip while, at the same time, overwriting a previous firmware image. However, when the newly loaded firmware version is verified within the chip, it may fail the verification process. When the firmware verification fails, the earlier firmware version that was overwritten is no longer available and thus the chip must revert to an even earlier default firmware version that resides in a secondary memory.

In one example of a system for updating firmware in a chip in a secure, authenticated manner, the updated firmware image is verified before it is loaded into the chip. Only if the updated firmware image is verified as authentic, will it then be loaded into the chip. An internal verification within the chip may still be performed. The internal verification is a second verification of the authenticity of the updated firmware version. Since the authenticity was first proved by the external verification, the updated firmware image is ensured to pass the authenticity verification performed by the chip. Because the internal verification will prove authenticity, the chip can avoid reverting to a default version in the default memory. In this manner, the system avoids actually loading non-authentic firmware into a chip and avoids losing the most recent version of firmware that is loaded in the chip due to a failed internal verification of new firmware.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

AES: advanced encryption standard.
ASIC: application specific integrated circuit.
CD: compact disk.
CD-R: CD recordable.
CD-RW: CD rewriteable.
DVD: digital versatile disk and/or digital video disk.
LAN: local area network.
PCI: peripheral component interconnect.
PCIE: PCI express.
RAM: random access memory.
DRAM: dynamic RAM.
SRAM: static RAM.
ROM: read only memory.
PROM: programmable ROM.
EPROM: erasable PROM.
EEPROM: electrically erasable PROM.
SHA-1: secure hash algorithm 1.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 1:
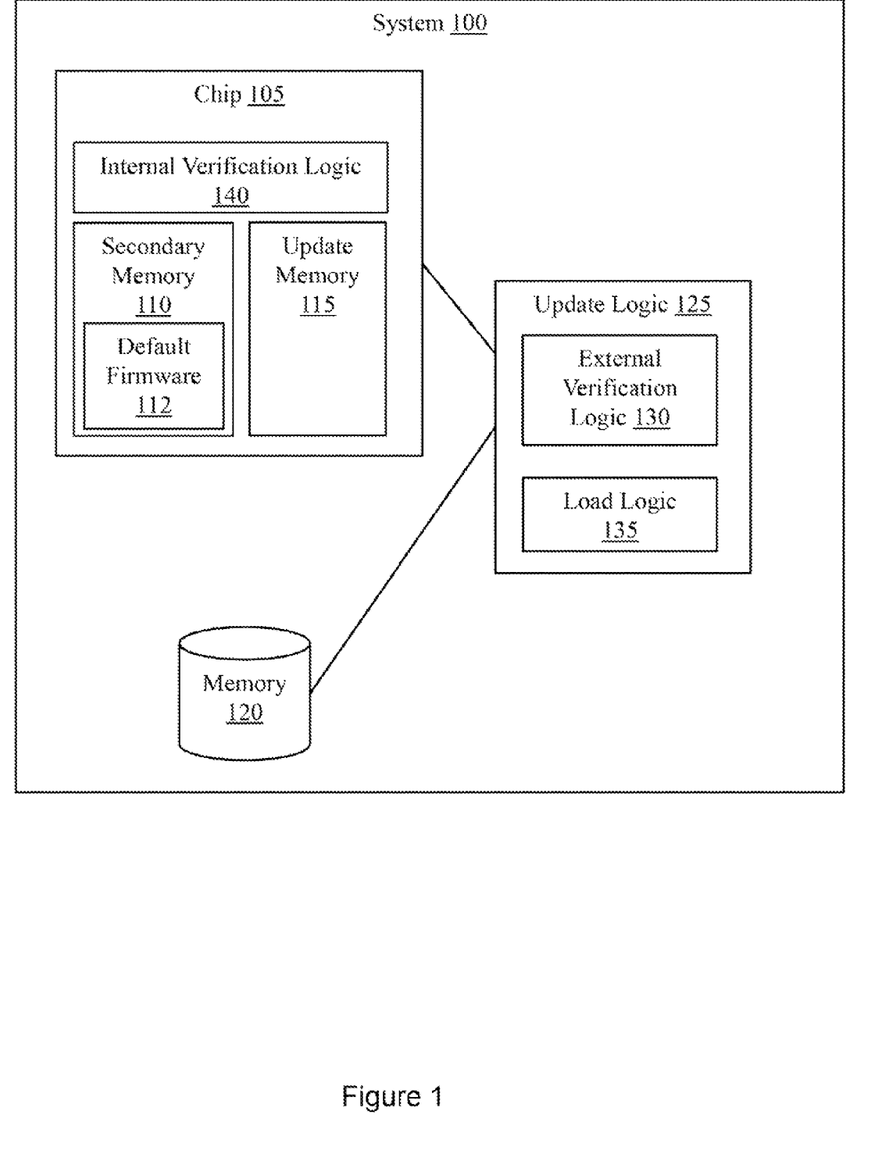
FIG. 1 illustrates an example system associated with updating firmware in a chip in a secure, authenticated manner.

FIG. 1 illustrates a system 100 that updates the firmware within a chip 105. The system 100 includes a computer component such as a chip 105. The chip 105 is a discrete component in one embodiment, although the chip 105 could be implemented in other embodiments as part of another discrete component or as multiple discrete components and components may be dedicated or shared. The chip 105 may be an integrated circuit such as an ASIC. In some embodiments, the chip 105 may be a trusted platform module (TPM). The chip 105 includes a secondary memory 110. In some embodiments, the secondary memory 110 is where a default version 112 of firmware is stored within the chip 105. In some embodiments, the default version 112 within the secondary memory 110 is a permanent version in a read only memory that cannot be erased. The chip 105 also includes an update memory 115. The update memory 115 is where an updated firmware image may be loaded. If there is no firmware image loaded into the update memory 115, then the default version 112 in the secondary memory 110 is executed within the chip 105.

The system 100 also includes a memory 120 that may be, for example, a computer-readable medium. The memory 120 is external to the chip 105 and is operatively coupled to an update logic 125 which is also external to the chip 105. The memory 120 may be volatile memory or non-volatile memory. Non-volatile memory may include, for example, ROM, PROM, and so on. Volatile memory may include, for example, RAM, SRAM, DRAM, and so on. In some embodiments, the memory 120 is a flash memory. The memory 120 is configured to store an updated firmware version.

The updated firmware version may be a new version of firmware developed by the manufacturer of the chip 105. For example, the updated firmware image may fix bugs in previous versions or may add new functionality. The updated firmware image may be delivered to the memory 120 by a suitable method including through a network or internet connection. In some embodiments, the memory 120 may be loaded with an updated firmware version by loading a computer with an updated firmware image and then transferring a copy of the updated firmware image into the memory 120. Alternatively, the updated firmware image may be loaded into the memory 120 from an external memory attached or inserted into the system 100. For example, a user of the system 100 may attach a memory stick to a computer port or insert a CD into a disc drive. An updated firmware image may then be read from the memory stick or CD and loaded into the memory 120.

The update logic 125 includes an external verification logic 130 and a load logic 135. The external verification logic 130 performs an external verification to authenticate an updated firmware image in the memory 120 external to the chip 105.

If an updated firmware image is authentic, the updated firmware image is considered to be unaltered and from a trusted source. If the external verification fails, then the update logic 125 causes the updated firmware image to be removed from the memory 120 and to not to be loaded into the update memory 115.

The load logic 135 is configured to load the updated firmware image into the update memory 115 of the chip 105. The loading by the load logic 135 may be conditioned upon the external verification logic 130 determining that the updated firmware image is authentic. When the updated firmware logic is loaded into the update memory 115, the previous version of firmware in the update memory 115 can be overwritten.

The chip 105 also includes an internal verification logic 140. The internal verification logic 140 is configured to authenticate the updated firmware image within the update memory 115. If such authentication fails, the chip 105 must revert to the default version 112 of firmware. This internal verification by the chip 105 is, however, assured to prove authenticity since authenticity was already proved by the prior external verification. Because the internal verification will prove authenticity, this avoids the chip 105 needing to revert to the default version 112. After the authentication by the internal verification logic 140, the chip 105 can use the updated firmware image in the update memory 115.

In some embodiments, the system 100 may include a computer system that includes the chip 105, the memory 120 and the update logic 125. The computer system may operate in a non-secure normal mode or a secure mode. When the computer system is operating in the non-secure normal mode an operating system and user applications may run on the computer system. When the computer system is operating in the secure mode the operating system and the user applications are prevented from interfering with the external verification, but the Basic Input/Output System (BIOS) routines may run. The update logic 125 may cause the computer system to switch to the secure mode of operation before the external verification is performed. After the loading of the updated firmware image to the update memory 115, the update logic 125 may cause the computer system to leave the secure mode and return to operating in the non-secure normal mode.

In other embodiments, the computer system also includes a processor. When the computer system is operating in the secure mode, the processor is operating in system management mode (SMM). SMM may be the operating mode released by a manufacturer for the x86 microprocessor architecture. In SMM, all normal applications, including the operating system, are suspended, and special, separate software, which is usually firmware or a hardware-assisted debugger, is executed in a high-privilege mode.

Figure 2:
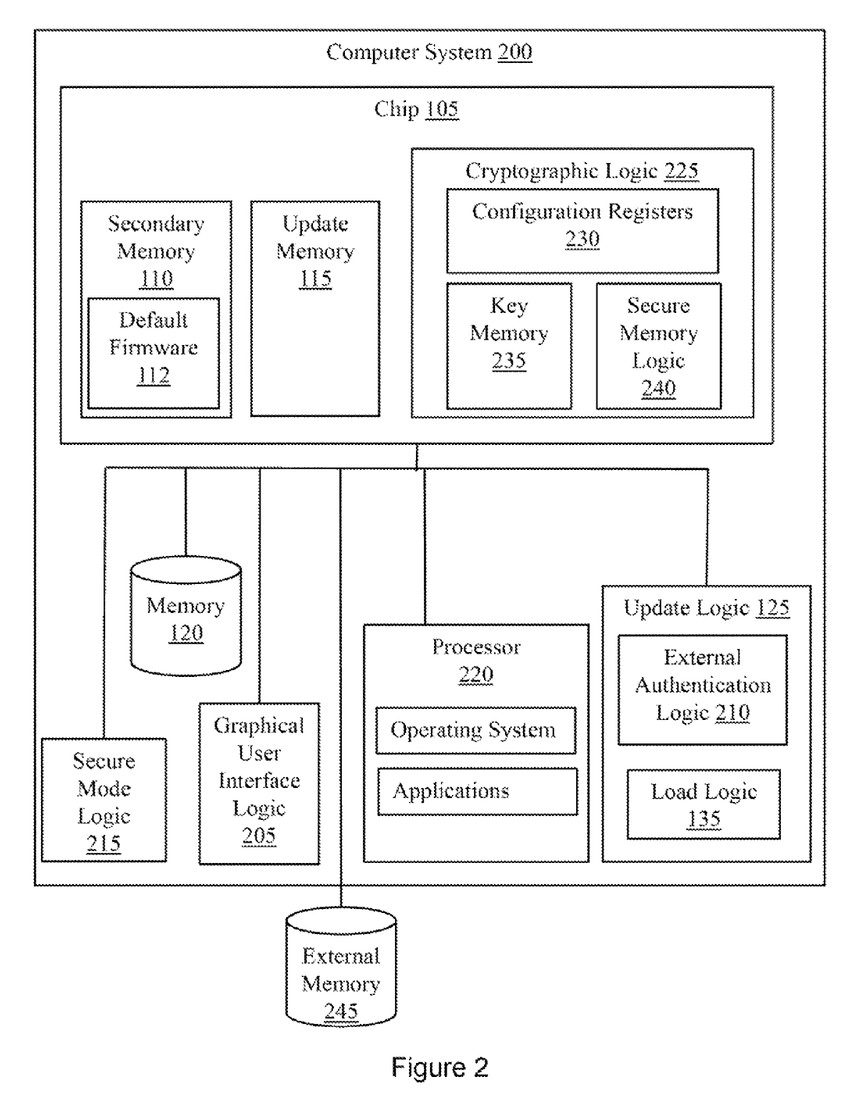
FIG. 2 illustrates another example system associated with updating firmware in a chip in a secure, authenticated manner.

FIG. 2 illustrates another embodiment of a computer system 200 for updating firmware within a chip 105. The computer system 200 includes a chip 105 that includes an update memory 115 containing current firmware, and a secondary memory 110 containing default firmware 112 as discussed above in connection with FIG. 1. The computer system 200 also includes a graphical user interface logic 205. The graphical user interface logic 205 may provide a signal to the user of the computer system 200 that an updated firmware image is available. In some embodiments, the graphical user interface logic 205 may detect when an updated firmware image is available in the memory 120 and notify a user of the computer system that a new firmware version is available. The graphical user interface logic 205 may additionally allow the user to select an option to load an updated firmware image into the chip 105. In another example, the graphical user interface logic 205 may be configured to allow the user to select one of several firmware versions stored earlier in the memory 120 for loading into the chip 105.

The computer system 200 includes an external authentication logic 210 within update logic 125. In some embodiments, the external authentication logic 210 is configured to perform, external to the chip 105, an external authentication of the updated firmware image. Authentication may indicate the updated firmware is from a trusted source and is unaltered. Authentication may include calculating a digital signature. The external authentication logic 210 is responsive to the option selected with the graphical user interface logic 205 to perform the external authentication. In some embodiments, the external authentication logic 210 is configured to produce an external verification result. The external verification result indicates if the update firmware image is authentic. In some embodiments, the external authentication logic 210 is configured to authenticate the updated firmware image by calculating a digital signature of the updated firmware image.

In some embodiments, the chip 105 is not involved in the external authentication process. In other embodiments, the chip 105 may provide some arithmetic support including calculating a hash, calculating a block encryption value, or calculating a block decryption value, as discussed below. In some embodiments, the external authentication logic 210 is configured to automatically detect when an updated firmware image is received and to automatically verify if it is authentic. In another embodiment, the external authentication logic 210 is configured to verify the updated firmware image only if a user has selected an option to verify the updated firmware image through the graphical user interface logic 205.

The computer system 200 prevents applications unnecessary to the external authentication from altering the external authentication. The computer system 200 may include a secure mode logic 215 and a processor 220. The secure mode logic 215 may control whether the computer system 200 operates in a non-secure normal mode or in a secure mode as discussed above. The processor 220 may be executing an operating system and applications which may be prevented from interfering with the external authentication if the processor 220 is in the secure mode.

The computer system 200 is configured to load the authenticated updated firmware image into the update memory 115. In other embodiments, load logic 135 within the update logic 125 is configured to load the updated firmware image into the update memory 115 within the chip 105. The secure mode logic 215 causes the computer system to leave the secure mode and to return to operating in a non-secure normal mode upon determining that the updated firmware image has been loaded into the update memory 115.

A cryptographic logic 225 within the chip 105 may perform an internal authentication when the updated firmware image is loaded into the update memory. The internal authentication is performed within the chip 105 to determine if the updated firmware image is authentic. The internal authentication is assured to succeed based on the external authentication succeeding. Because the internal authentication will succeed, the chip 105 avoids reverting to the default firmware.

In some embodiments, the computer system 200 may include a cryptographic logic 225. The cryptographic logic 225 may provide arithmetic support to the external authentication logic 210. For example, authentication of the updated firmware image may involve the verification of a digital signature of the updated firmware image. Digital signature functions often require hash and/or exponentiation function calculations such as those used by RSA (also known as the Ronald L. Rivest, Adi Shamir, and Leonard Adleman algorithm) signatures. For example, the digital signature verification functions can be calculated with software, but it may take many instructions and require functionality outside the chip 105. However, if the external authentication logic 210 uses the dedicated hardware within the cryptographic logic 225, the chip 105 may perform a digital signature verification in just a few clock cycles and reduce the need for duplicate functionality outside the chip 105.

The cryptographic logic 225 may also include configuration registers 230, a key memory 235, and a secure memory logic 240. The configuration registers 230 may be operable to configure the cryptography logic 225 to perform different hashing or different encryption functions. For example, when a certain value is written to a configuration register, the cryptography logic 225 may be configured to calculate a secure hash algorithm 1 (SHA-1) with a 256 bit key using 128 bit blocks of input data. If a different value is written to a configuration register, then the cryptography logic 225 may be configured to encrypt data using the AES algorithm with 192 bit keys. The key memory 235 may be configured to store and manage keys used in cryptographic operations. The secure memory logic 240 may be configured to only allow authorized users to access certain memory or may fully encrypt the data located in some memories.

In some embodiments, the computer system 200 may store the updated firmware image in a memory 120 after it is received by the computer system 200. As discussed above, the updated firmware image may have been received by the computer system 200 from a network, the internet, or uploaded to the computer system 200 from an external memory 245. The external memory 245 may be, for example, a disc drive, a memory stick, and so on.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
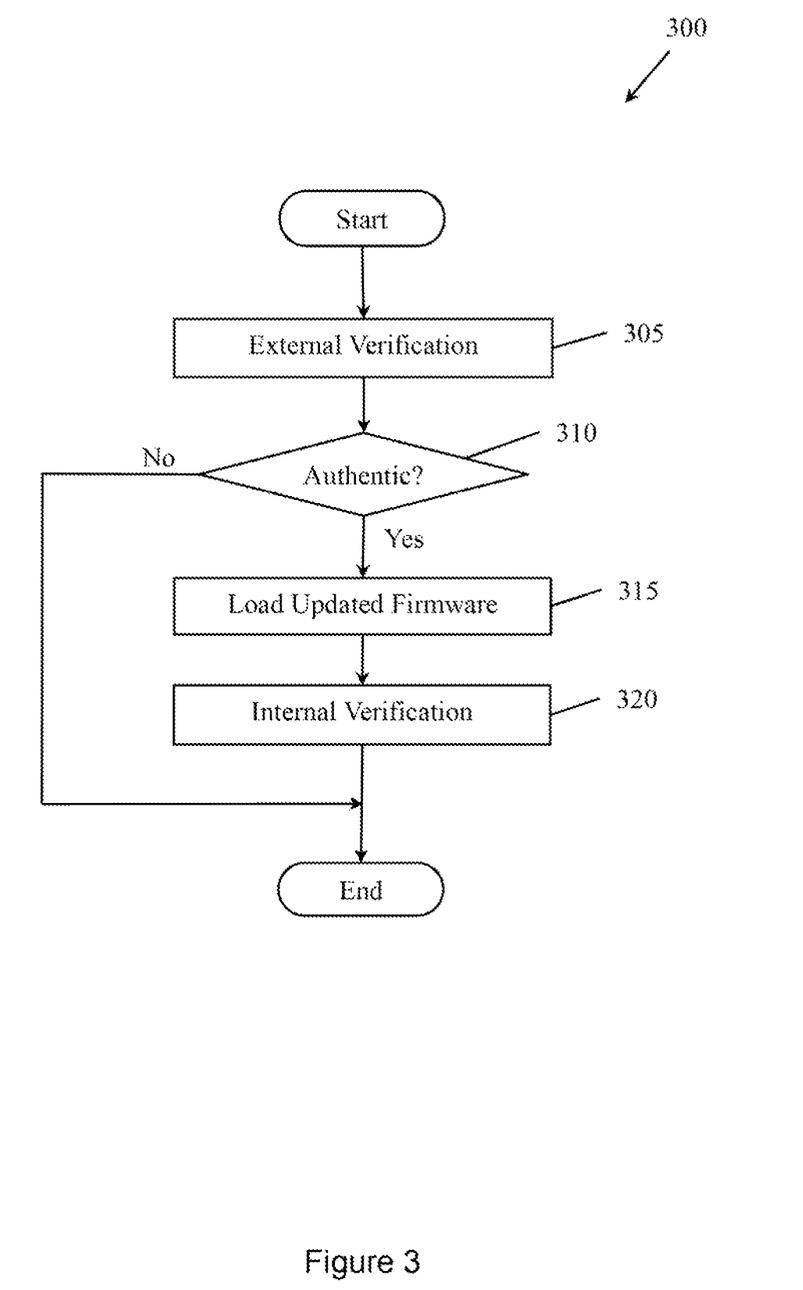
FIG. 3 illustrates an example method associated with updating firmware in a chip in a secure, authenticated manner.

FIG. 3 illustrates a method 300 associated with updating firmware in a chip in a secure, authenticated manner. The chip into which the firmware may be uploaded includes an update memory containing a current firmware and a read only memory containing a default firmware. The method 300 begins, at 305, by performing an external verification of updated firmware received and stored external to the chip. The verification determines if the updated firmware is authentic. At 310 a determination is made as to whether the external verification was authentic. If the verification was not authentic then the method 300 ends.

If the verification was authentic, then, at 315, the updated firmware is loaded into the update memory. The loading overwrites the current firmware that existed in the update memory prior to the loading. The method 300 includes, at 320, performing an internal verification of the updated firmware within the chip. The internal verification, at 320, determines that the updated firmware is authentic. The internal verification, at 320, is assured to succeed based on the external verification. Because the internal verification is assured to succeed, the chip avoids reverting to the default firmware.

Figure 4:
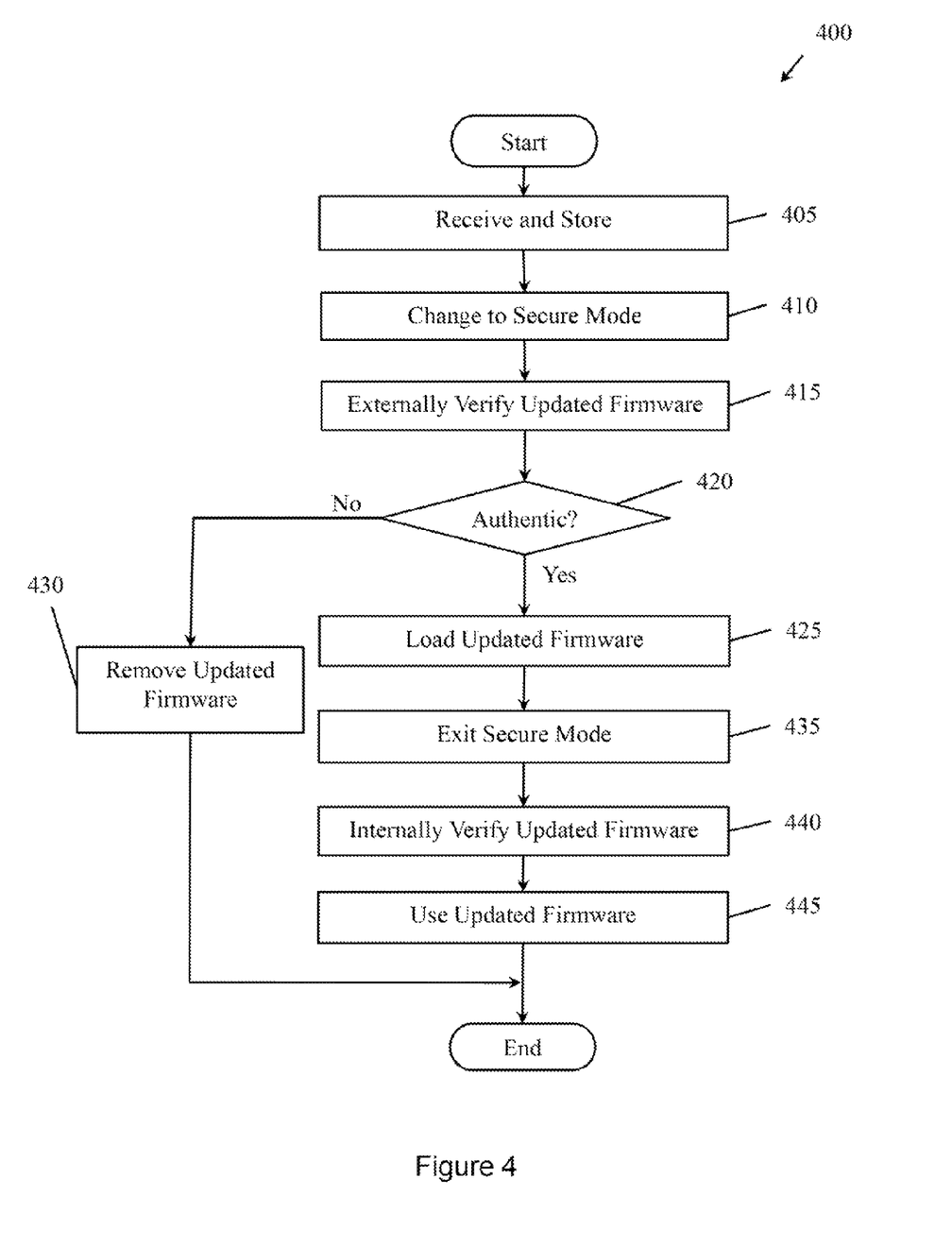
FIG. 4 illustrates another example method associated with updating firmware in a chip in a secure, authenticated manner.

FIG. 4 illustrates another method 400 for updating firmware in a chip. The method may be performed by a computer system. As discussed above, the chip may include an update memory containing a current firmware and a read only memory containing a default firmware. The default firmware is executed when there is no other version of firmware loaded in the update memory. The method 400 begins, at 405, by receiving and storing the updated firmware external to the chip. A computer system may be operating in a non-secure normal mode when the updated firmware is received.

Method 400 includes, at 410, changing the computer system to operate in a secure mode. The change may be made when the computer system receives updated firmware. In some embodiments, when operating in the non-secure normal mode, the operating system and user applications are allowed to run on the computer system. When the computer system is operating in the secure mode, the operating system and the user applications are prevented from interfering with the external verification as discussed below. In the secure mode, the Basic Input/Output System (BIOS) routines may be permitted to continue to execute.

Method 400 also includes, at 415, performing an external verification of the updated firmware to determine if the updated firmware is authentic. While in secure mode, applications are prevented from altering the outcome of the external verification so that the external verification produces the correct result. A decision is made, at 420, as to whether the external authentication passed or failed. If the external verification passed, the updated firmware is authentic and method 400 may proceed to 425. Failure means the updated firmware is not authentic, so it is removed, at 430, and not loaded into the update memory.

If external verification passed, the updated firmware is loaded, at 425, into the update memory of the chip. When the firmware is loaded, it may overwrite the current firmware in the update memory. After the updated firmware is loaded, at 425, method 400 proceeds, at 435, to remove the computer system from the secure mode and to return to operating in the non-secure normal mode.

Similar to FIG. 3, while the updated firmware is in the update memory, the chip performs an internal verification of the updated firmware at 440. The internal verification is performed within the chip to determine that the updated firmware is authentic. The internal verification, at 440, is assured to succeed based on the external verification at 415 and avoids the chip reverting to the default firmware. When the internal verification succeeds, method 400 proceeds, at 445, to operate the chip using the updated firmware in the update memory.

Figure 5:
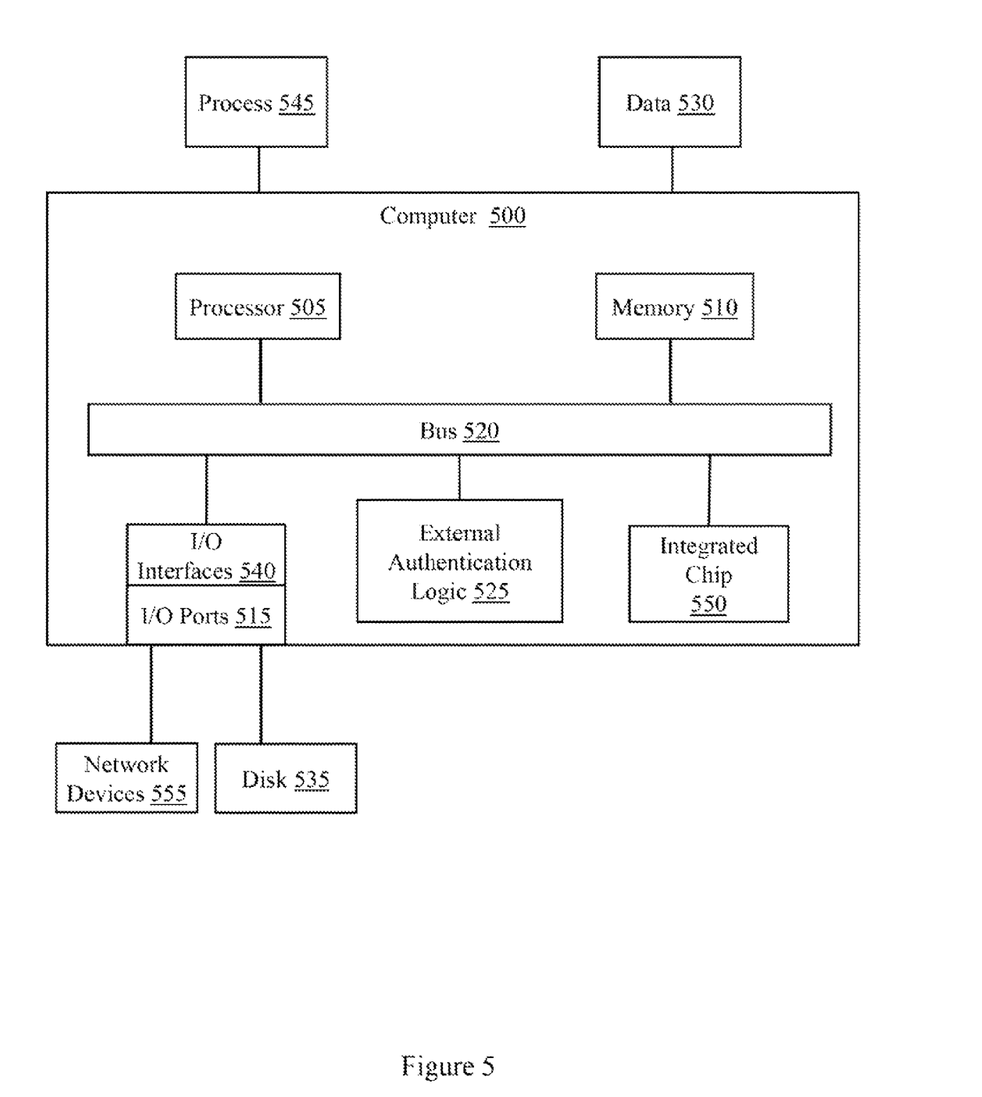
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 505, a memory 510, and input/output ports 515 operably connected by a bus 520. In one example, the computer 500 may include an external authentication logic 525 configured to facilitate performing the authentication of an updated firmware image. In different examples, the external authentication logic 525 may be implemented in hardware, software, firmware, and/or combinations thereof. While the external authentication logic 525 is illustrated as a hardware component attached to the bus 520, it is to be appreciated that in one example, the external authentication logic 525 could be implemented in the processor 505.

Thus, external authentication logic 525 may provide means (e.g., hardware, software, firmware) for externally verifying that an updated firmware image is authentic. The means may be implemented, for example, as an ASIC programmed to externally verify that an updated firmware image is authentic. The means may also be implemented as computer executable instructions that are presented to the computer 500 as data 530 that are temporarily stored in memory 510 and then executed by processor 505. External authentication logic 525 may also provide means (e.g., hardware, software, firmware) for externally verifying that an updated firmware image is authentic.

Generally describing an example configuration of the computer 500, the processor 505 may be a variety of various processors including dual microprocessor and other multi-processor architectures. A memory 510 may include volatile memory and/or non-volatile memory as discussed above.

A disk 535 may be operably connected to the computer 500 via, for example, an input/output interface (e.g., card, device) 540 and an input/output port 515. The disk 535 may be, for example, a magnetic disk drive, a solid state disk drive, a floppy disk drive, a tape drive, a Zip drive, a flash memory card, a memory stick, and so on. Furthermore, the disk 535 may be a CD-ROM drive, a CD-R drive, a CD-RW drive, a DVD ROM, and so on. The memory 510 can store a process 545 and/or a data 530, for example. The disk 535 and/or the memory 510 can store an operating system that controls and allocates resources of the computer 500.

An integrated chip 550 may be in operable connection with the bus 520. After the authentication logic 525 has verified the updated firmware image is authentic, the updated firmware image may be loaded into the integrated chip 550. After the integrated chip 550 is loaded with the updated firmware image, the integrated chip 550 may perform an internal verification of the updated firmware image. The internal verification will succeed based on the external verification succeeding. After the internal verification succeeds, the integrated chip 550 may then operate using the updated firmware image.

The bus 520 may be a single internal bus interconnect architecture and/or other bus or mesh architectures. While a single bus is illustrated, it is to be appreciated that the computer 500 may communicate with various devices, logics, and peripherals using other busses (e.g., PCI, PCIE, 1394, USB, Ethernet). The bus 520 can be types including, for example, a memory bus, a memory controller, a peripheral bus, an external bus, a crossbar switch, and/or a local bus.

The computer 500 may interact with input/output devices via the i/o interfaces 540 and the input/output ports 515. Input/output devices may be, for example, a keyboard, a microphone, a pointing and selection device, cameras, video cards, displays, the disk 535, network devices 555, and so on. The input/output ports 515 may include, for example, serial ports, parallel ports, and USB ports.

The computer 500 can operate in a network environment and thus may be connected to the network devices 555 via the i/o interfaces 540, and/or the i/o ports 515. Through the network devices 555, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g.; a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system comprising:
   a chip that includes an update memory containing a current version of firmware, and a secondary memory containing a default version of firmware;
   an update logic comprising:
      an external verification logic to perform an external verification to authenticate an updated firmware image in a memory external to the chip, the external verification logic being external of the chip; and
      a load logic to load the updated firmware image into the update memory of the chip in response to the external verification logic determining that the updated firmware image is authentic; and
   the chip also including an internal verification logic to authenticate the updated firmware image within the update memory.

2. The system of claim 1, comprising:
   a computer including the chip, the memory external to the chip, and the update logic;
   where the update logic to cause the computer to switch to a secure mode of operation before the external verification is performed, wherein an operating system is not allowed to run in the secure mode; and
   where the update logic is to cause the computer to leave the secure mode and return to operating in a non-secure normal mode, after the loading, wherein the operating system is allowed to run in the non-secure normal mode.

3. The system of claim 2, further comprising Basic Input/Output System (BIOS) routines to run when the computer is operating in the secure mode, and where the operating system and a user application are prevented from interfering with the external verification when the computer is operating in the secure mode, and where the operating and the user application are allowed to run on the computer system when the computer is in the non-secure normal mode.

4. The system of claim 2, where the computer includes a processor, and the processor is to operate in system management mode (SMM) when the computer is operating in the secure mode.

5. The system of claim 1, where the update memory is a flash memory.

6. The system of claim 1, where the chip is to use the updated firmware image in the update memory upon determining the authentication performed by the internal verification logic succeeded; and where the internal verification is to prevent the chip from reverting to the default version of firmware.

7. The system of claim 1, where the update logic is to remove the updated firmware image from the memory and is not to load the updated firmware image into the update memory upon determining the external verification failed.

8. The system of claim 1, where the chip is a trusted platform module.

9. A computer-implemented method comprising:
 performing, by an external verification logic in a computer system, an external verification of updated firmware received and stored in a memory external to a chip, to determine if the updated firmware is authentic, the external verification logic being external of the chip that includes update memory containing a current firmware and secondary memory containing a default firmware;
 in response to the external verification logic determining that the updated firmware in the memory external to the chip is authentic, loading the updated firmware into the update memory to overwrite the current firmware; and
 performing an internal verification of the updated firmware by an internal verification logic within the chip to determine that the updated firmware loaded into the update memory is authentic.

10. The computer-implemented method of claim 9, further comprising:
 changing an operation of the computer system from a non-secure normal mode to a secure mode upon determining that the updated firmware has been received, wherein an operating system is not allowed to run in the secure mode;
 performing the external verification while in the secure mode; and
 exiting the secure mode and returning to the non-secure normal mode after the loading, wherein the operating system is allowed to run in the non-secure normal mode.

11. The computer-implemented method of claim 10, where while in the secure mode applications are prevented from altering an outcome of the external verification.

12. The computer-implemented method of claim 10, where when in the non-secure normal mode the operating system and user applications are allowed to run on the computer system, where when in the secure mode the operating system and the user applications are prevented from interfering with the external verification, but Basic Input/Output System (BIOS) routines are permitted to execute.

13. The computer-implemented method of claim 10, where operating the computer system in the secure mode includes operating a processor in the computer system in system management mode (SMM).

14. The computer-implemented method of claim 9, where the update memory is a flash memory, and where the loading comprises flashing the update memory.

15. The computer-implemented method of claim 9, where the internal verification is assured to succeed based on the external verification succeeding and where the internal verification prevents the chip from reverting to the default firmware; and further comprising:
 operating the chip using the updated firmware in the update memory.

16. The computer-implemented method of claim 9, further comprising removing the updated firmware stored in the memory external to the chip and not loading the updated firmware into the update memory upon detecting that the external verification has failed.

17. The computer-implemented method of claim 9, further comprising executing the default firmware when there is no other version of firmware loaded in the update memory.

18. A computer system for updating firmware within a chip, the computer system comprising:
 a chip including an update memory containing current firmware, and a secondary memory containing default firmware;
 a graphical user interface logic to allow a user to select an option to load an updated firmware image into the chip;
 an external authentication logic, responsive to the option selected, to perform external to the chip an external authentication of the updated firmware image;
 where the computer system is configured to prevent applications unnecessary to the external authentication from altering the external authentication and to load the updated firmware image into the update memory if the updated firmware image is authentic; and
 a cryptographic logic within the chip, where the cryptographic logic is configured to perform an internal authentication within the chip to determine if the updated firmware image is authentic and to prevent the chip from reverting to the default firmware, where the internal authentication is assured to succeed based on the external authentication succeeding.

19. The computer system of claim 18, where the external authentication indicates whether the updated firmware image is from a trusted source and is unaltered.

20. The computer system of claim 18, where the external authentication logic is configured to authenticate by calculating a digital signature.

* * * * *